United States Patent
Kamei

(10) Patent No.: US 10,924,657 B2
(45) Date of Patent: Feb. 16, 2021

(54) SETTING APPARATUS AND CONTROL METHOD THEREOF

(71) Applicant: CANON KABUSHIKI KAISHA, Tokyo (JP)

(72) Inventor: Chiaki Kamei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/157,521

(22) Filed: Oct. 11, 2018

(65) Prior Publication Data

US 2019/0124256 A1 Apr. 25, 2019

(30) Foreign Application Priority Data

Oct. 20, 2017 (JP) .................................. 2017-203703

(51) Int. Cl.
*H04N 7/00* (2011.01)
*H04N 5/00* (2011.01)
(Continued)

(52) U.S. Cl.
CPC ..... *H04N 5/23216* (2013.01); *H04N 5/23206* (2013.01); *H04N 5/44504* (2013.01); *H04N 7/18* (2013.01); *H04N 7/183* (2013.01); *G06T 7/20* (2013.01); *G06T 2207/20104* (2013.01); *G06T 2207/30232* (2013.01)

(58) Field of Classification Search
CPC ........... H04N 5/23216; H04N 5/23206; H04N 5/44504; H04N 7/18; H04N 7/183; G06T 7/20; G06T 2207/20104; G06T 2207/30232

See application file for complete search history.

(56) References Cited

U.S. PATENT DOCUMENTS 6,208,379 B1 3/2001 Oya
7,667,735 B2 2/2010 Ikeyama
(Continued)

FOREIGN PATENT DOCUMENTS

CN 1603937 A 4/2005
CN 102457678 A 5/2012
(Continued)

OTHER PUBLICATIONS

European Search Report issued in corresponding European Application No. 18198136.6 dated Nov. 23, 2018.
(Continued)

*Primary Examiner* — Zhihan Zhou
(74) *Attorney, Agent, or Firm* — Venable LLP

(57) ABSTRACT

In order to support the setting of a processing target region, a setting apparatus comprises: a first setting unit configured to set a first region which is to be a target of predetermined processing in a captured region; a second setting unit configured to set a second region which is to be excluded from the target of predetermined processing in the captured region; and a restricting unit configured to restrict a settable range of a region in at least one of the first setting unit and the second setting unit. In a case in which the other region of the first region and the second region is to be set after one region among the first region and the second region has been set, the restricting unit restricts the settable range of the other region based on the one region.

11 Claims, 9 Drawing Sheets

(51) Int. Cl.
*H04N 5/232* (2006.01)
*H04N 7/18* (2006.01)
*H04N 5/445* (2011.01)
*G06T 7/20* (2017.01)

(56) References Cited

U.S. PATENT DOCUMENTS

| | | | |
|---|---|---|---|
| 2004/0141633 A1* | 7/2004 | Horie | G06K 9/00771 382/103 |
| 2004/0223059 A1 | 11/2004 | Yoshimura et al. | |
| 2004/0223191 A1 | 11/2004 | Murata | |
| 2005/0285950 A1 | 12/2005 | Oya | |
| 2010/0007736 A1* | 1/2010 | Mori | G08B 13/19608 348/155 |
| 2010/0194566 A1* | 8/2010 | Monden | G07C 9/00 340/568.1 |
| 2012/0169842 A1 | 7/2012 | Chuang | |
| 2012/0242788 A1 | 9/2012 | Chuang | |
| 2014/0211002 A1* | 7/2014 | Lin | H04N 7/181 348/143 |

FOREIGN PATENT DOCUMENTS

| | | |
|---|---|---|
| CN | 102577347 A | 7/2012 |
| CN | 103065412 A | 4/2013 |
| CN | 103795987 A | 5/2014 |
| CN | 104038740 A | 9/2014 |
| CN | 105144703 A | 12/2015 |
| CN | 105391983 A | 3/2016 |
| CN | 105894700 A | 8/2016 |
| CN | 106131499 A | 11/2016 |
| CN | 106454238 A | 2/2017 |
| EP | 2120452 A1 | 11/2009 |
| JP | H10-051761 A | 2/1998 |
| JP | 2003259189 A | 9/2003 |
| JP | 2004304556 A | 10/2004 |
| JP | 2008181347 A | 8/2008 |
| JP | 4508038 B2 | 7/2010 |
| JP | 2013065351 A | 4/2013 |
| WO | 2014156908 A1 | 10/2014 |

OTHER PUBLICATIONS

Chinese Office Action dated Apr. 14, 2020 in counterpart Chinese Patent Application No. 201811208986.6.

* cited by examiner

SETTING APPARATUS AND CONTROL METHOD THEREOF

BACKGROUND OF THE INVENTION

Field of the Invention

The present invention relates to a technique for supporting the setting of a processing target region in a captured image.

Description of the Related Art

There is known a monitoring system that controls a monitoring camera by remote control via a communication network and monitors an image captured by the monitoring camera. In the monitoring system, there is a setting apparatus for controlling the monitoring camera by using a user interface (UI). Among setting apparatuses, there is a setting apparatus that has a graphical user interface (GUI) that makes settings by using an image captured by the monitoring camera. For example, a setting apparatus for a monitoring camera, which has a function called intrusion detection for detecting a moving object that has entered a set region, is provided with a GUI for setting a detection region by drawing the detection region in an image actually captured by the monitoring camera.

However, although a UI that allows settings to be made on only a detection region to be processed is generally known, there may be cases in which the drawing of the region becomes complex. For example, in a case in which an entry permitted region is present inside an entry prohibited region, there may be a plurality of detection regions for intrusion detection or the shape of the detection region may become complex. Hence, the setting can become complicated. Japanese Patent Laid-Open No. 2008-181347 (patent literature 1) discloses a system in which the setting of a detection processing target region can be made easily by setting a processing exclusion region to which the detection processing is not to be performed.

However, in the technique disclosed in the above-described patent literature 1, the designation of a processing exclusion region and a processing region may be useless depending on the location of the region designated by the user. For example, in a case in which a processing exclusion region is designated so as to cover an intrusion detection region, which is to undergo the detection processing, because the processing exclusion region has a higher priority than the intrusion detection region, the setting of the intrusion detection can become invalid as a result.

SUMMARY OF THE INVENTION

According to one aspect of the present invention, a setting apparatus comprises: a first setting unit configured to set a first region which is to be a target of predetermined processing in a captured region of a capturing device; a second setting unit configured to set a second region which is to be excluded from the target of predetermined processing in the captured region; and a restricting unit configured to restrict a settable range of a region in at least one of the first setting unit and the second setting unit, wherein in a case in which the other region of the first region and the second region is to be set after one region among the first region and the second region has been set, the restricting unit restricts the settable range of the other region based on the one region.

The present invention provides a technique capable of suitably supporting the setting of a processing target region in a captured image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings. Note that the following embodiments are merely examples, and the technical scope of the present invention is not limited by the following embodiments.

First Embodiment

A client apparatus that sets a processing target region of a monitoring camera in a monitoring system will be described below as an example of a setting apparatus according to the first embodiment of the present invention.

<System Arrangement>

Figure 1:
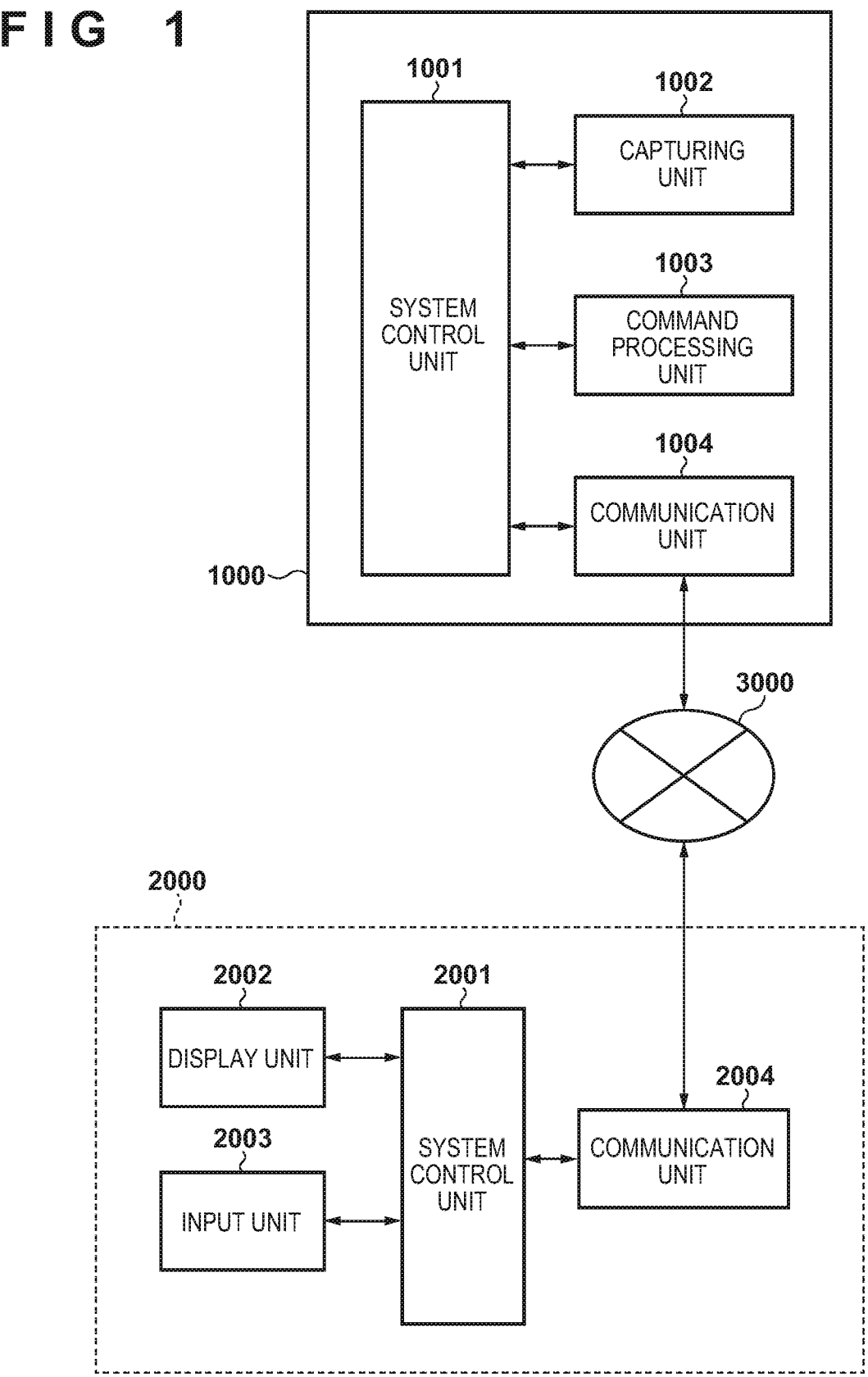
FIG. 1 is a block diagram showing the overall arrangement of a monitoring system according to the first embodiment.

FIG. 1 is a block diagram showing the overall arrangement of a monitoring system according to the first embodiment. The monitoring system includes a monitoring camera 1000 and a client apparatus 2000 which are communicably connected via a network 3000.

The monitoring camera 1000 includes a system control unit 1001, a capturing unit 1002, a command processing unit 1003, and a communication unit 1004. The capturing unit 1002 is formed from a lens and an image capturing element, performs image capturing of an object and converts the captured image into electrical signals, and performs predetermined image processing on the signals. The command processing unit 1003 executes control and processing of the monitoring camera 1000 by interpreting control commands input from the client apparatus 2000 via the communication unit 1004. For example, the command processing unit receives a control command which includes region settings of a "processing region" and a "processing exclusion region" which are to be described later, and controls the execution of various kinds of processes (photometry, moving object detection, and the like) in the capturing unit 1002 and the system control unit 1001 based on the region settings. In addition to distributing generated captured images to the client apparatus 2000, the communication unit 1004 receives control and commands from the client apparatus 2000. The system control unit 1001 integrally controls the respective functions.

The client apparatus 2000 includes a system control unit 2001, a display unit 2002, an input unit 2003, and a communication unit 2004. The display unit 2002 plays back the captured image transmitted from the monitoring camera 1000. The input unit 2003 is an interface that accepts the control and the region designation to the monitoring camera 1000. The communication unit 2004 not only receives various kinds of data starting from a captured image from the monitoring camera 1000, but also transmits control and region information accepted via the input unit 2003 to the monitoring camera 1000. The system control unit 2001 controls the respective functions.

Figure 2A:
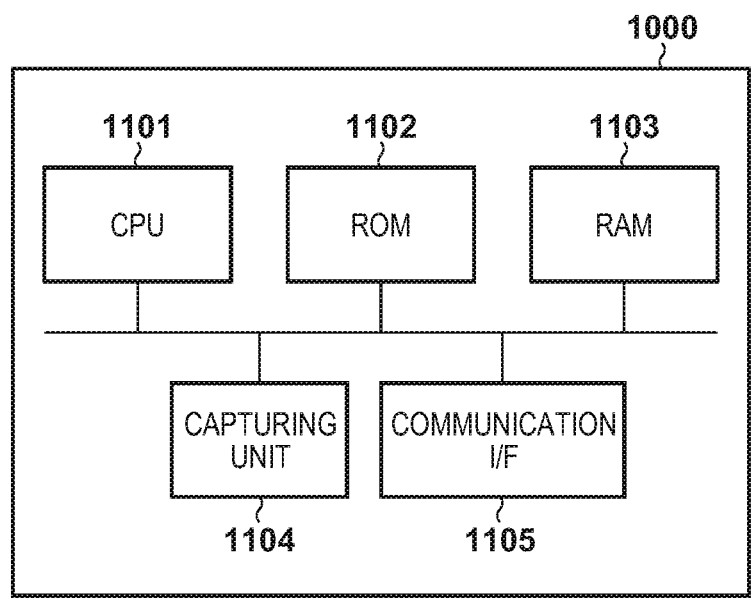
FIGS. 2A and 2B are block diagrams showing the hardware arrangements of a monitoring camera and a client apparatus, respectively.
Figure 2B:
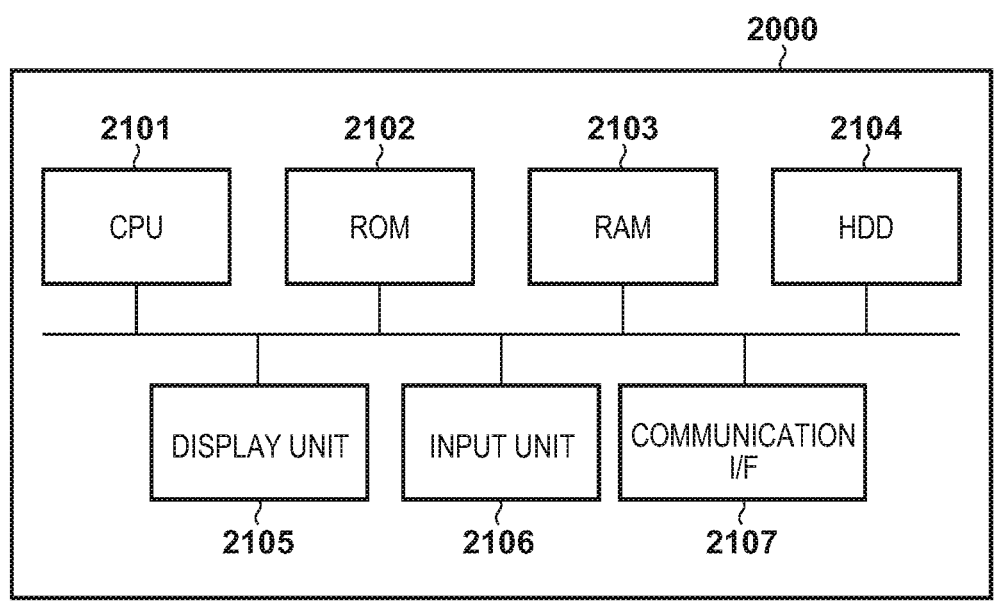

FIGS. 2A and 2B are block diagrams showing the hardware arrangements of the monitoring camera 1000 and the client apparatus 2000, respectively. FIG. 2A shows the arrangement of the monitoring camera 1000, and FIG. 2B shows the arrangement of the client apparatus 2000.

A monitoring camera 1000 includes a CPU 1101, a ROM 1102, a RAM 1103, a capturing unit 1104, and a communication I/F 1105.

The CPU 1101 integrally controls the operation of the monitoring camera 1000 and controls each of the components (1102 to 1105). The ROM 1102 is a nonvolatile memory that stores control programs and the like which are necessary for the CPU 1101 to execute processing. The ROM also stores the current setting values of the capturing unit 1104. Note that a form in which the control programs and the like are stored in and read out from an external memory or a detachable storage medium (not shown) may also be adopted. The RAM 1103 functions as a main memory, a work area, and the like of the CPU 1101. That is, the CPU 1101 implements the various kinds of functions by loading a necessary program or the like from the ROM 1102 to the RAM 1103 at the execution of the processing and executing the necessary program or the like.

The capturing unit 1104 is a functional unit corresponding to the capturing unit 1002 of FIG. 1. The communication I/F 1105 is a functional unit to execute communication with another apparatus via the network 3000. The communication I/F 1105 transmits, for example, a captured image obtained by the capturing unit 1104 to the client apparatus 2000 via the network 3000.

Some or all of the functions of the components of the monitoring camera 1000 can be implemented by the CPU 1101 executing a program. However, at least some of the components of the monitoring camera 1000 shown in FIG. 1 may be formed by dedicated hardware. In this case, the dedicated hardware operates under the control of the CPU 1101.

The client apparatus 2000 includes a CPU 2101, a ROM 2102, a RAM 2103, an HDD 2104, a display unit 2105, an input unit 2106, a communication I/F 2107.

The CPU 2101 integrally controls the operation of the client apparatus 2000 and controls each of the components (2102 to 2107). The ROM 2102 is a nonvolatile memory that stores control programs and the like which are necessary for the CPU 2101 to execute processing. The RAM 2103 functions as a main memory, a work area, and the like of the CPU 2101. That is, the CPU 2101 implements the various kinds of functions by loading a necessary program or the like from the ROM 2102 to the RAM 2103 at the execution of the processing and executing the necessary program or the like.

The HDD 2104 stores various kinds of data, various kinds of information, and the like necessary when the CPU 2101 is to execute processing using a program, and stores various kinds of data, various kinds of information, and the like obtained by executing processing using the program.

The display unit 2105 corresponds to the display unit 2002 of FIG. 1 and displays, via a GUI, a captured image received from the monitoring camera 1000 and the current setting values of the monitoring camera 1000. The input unit 2106 is formed from a power button, a keyboard, a mouse, a touch panel, and the like, and accepts command control from a user. The communication I/F 2107 receives various kinds of data from the monitoring camera 1000 and transmits the various kinds of data via the network 3000. For example, the communication I/F receives a captured image generated in the monitoring camera 1000 and the current setting values of the capturing unit 1104, and transmits control commands to the monitoring camera 1000.

Some or all of the functions of the components of the client apparatus 2000 can be implemented by the CPU 2101 executing a program. However, at least some of the components of the client apparatus 2000 shown in FIG. 1 may be formed by dedicated hardware. In this case, the dedicated hardware operates under the control of the CPU 2101.

Here, assume that the "processing region" and the "processing exclusion region" set by the client apparatus 2000 are transmitted to the monitoring camera 1000 by a control command. That is, it is assumed that various kinds of processes (photometry, moving object detection, and the like) based on the region settings will be performed in the monitoring camera 1000. However, it may also be arranged so that an apparatus (including the client apparatus 2000) other than the monitoring camera 1000 will execute the various kinds of processes (photometry, moving object detection, and the like) based on the region settings on the captured image input from the monitoring camera 1000.

<Arrangement of GUI>

A GUI which is to be displayed on the display unit 2105 of the client apparatus 2000 will be described with reference to FIGS. 3A to 3C hereinafter. The GUI is used by the user to designate a "processing region", which causes a captured region of the monitoring camera 1000 to be set as a predetermined processing target, and a "processing exclusion region", which causes the captured region to be set as a region to be excluded as the predetermined processing target. Here, a captured image obtained by the monitoring camera 1000 is displayed as the captured region. Although photometry processing for executing appropriate exposure in the monitoring camera 1000 will be exemplified as the predetermined processing in the following explanation, other arbitrary image processes such as moving object processing and the like are also applicable.

Figure 3A:
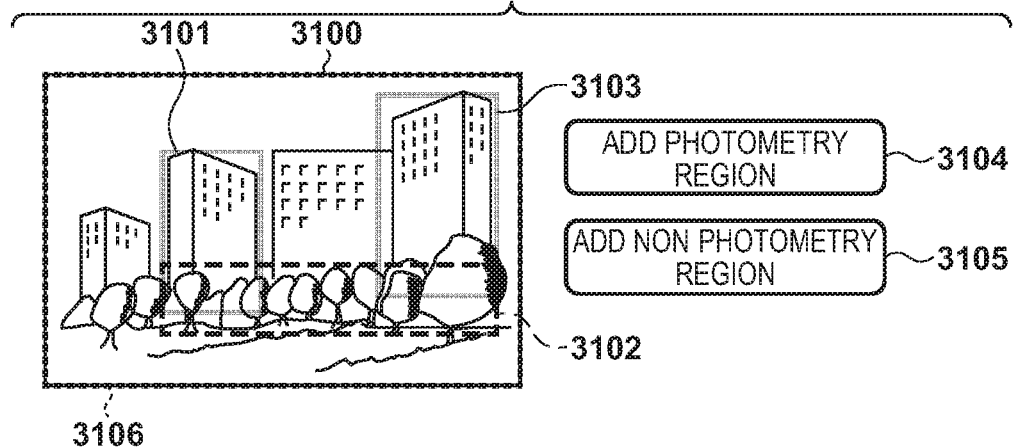
FIGS. 3A to 3C are views each showing a GUI for designating a processing region and a processing exclusion region.

FIG. 3A is a view showing a GUI for designating a processing region and a processing exclusion region. A captured image display unit 3100 causes a processing region and a processing exclusion region designated by the user via the input unit 2106 to overlap a captured image generated by the capturing unit 1104, and displays the overlapped image. An example in which a photometry region, which is to be the photometry target as a processing region, has been designated by a rectangular shape and a non-photometry region, which is to be excluded from a photometry target, as a processing exclusion region has been designated by a rectangular shape, is shown here.

That is, the photometry region is a processing region for designating the range in which the photometry processing is to be performed in the captured image at the time of auto exposure. For example, a user can select a region, such as a gaze region, where he/she desires to adjust the exposure appropriately. On the other hand, a non-photometry region is a region designated so that it will be excluded from the photometry processing in the captured image.

For example, if a light source such as a light bulb or a fluorescent lamp is included in the photometry region, regions other than the light source tend to become dark (that is become underexposed) by receiving the influence of the brightness of the light source. Hence, appropriate exposure can be obtained by allowing the user to explicitly designate a non-photometry region to remove a factor that will be easily influenced by the exposure. Thus, a non-photometry region will be designated so that it will overlap a specific region in the photometry region.

A region addition button 3104 is a button for adding a photometry region. For example, a rectangle for designating a photometry region is displayed in a predetermined position (default position) in the captured image display unit 3100 when the user presses the button via a mouse, and the user can set the photometry region by making a deformation operation on the rectangle via the mouse. A region addition button 3105 is a button for adding a non-photometry region. For example, a rectangle for designating a non-photometry region is displayed in the captured image display unit 3100 when the user presses the button via a mouse, and the user can set the non-photometry region by making a deformation operation on the rectangle via the mouse. A region 3101 and a region 3103 indicate the photometry regions, and each region is indicated by a gray solid-line rectangle in FIG. 3A. A region 3102 indicates a non-photometry region, and is indicated by a black broken-line rectangle.

A movable region 3106 is a restriction indication showing the settable range in which the respective regions can be designated. In the initial state in which neither the photometry region nor the non-photometry region has been selected, the movable region is set to be the entire display region of the captured image display unit 3100. The deformation of each rectangle as described above is restricted so as to fall within the range of the movable region 3106. The movable region will be described in detail later.

Note that the shape, the color of the display frame, and the form of the line used for the photometry region and those used for the non-photometry region are arbitrary, but it is desirable to use those that allow the two regions to be easily identified. In addition, the form of the GUI for adding the photometry region and the non-photometry region may be other than the two buttons described above. For example, it may be formed as a GUI which has a menu that allows the selection of the setting of a photometry region or a non-photometry region and a single region addition button.

Figure 3B:
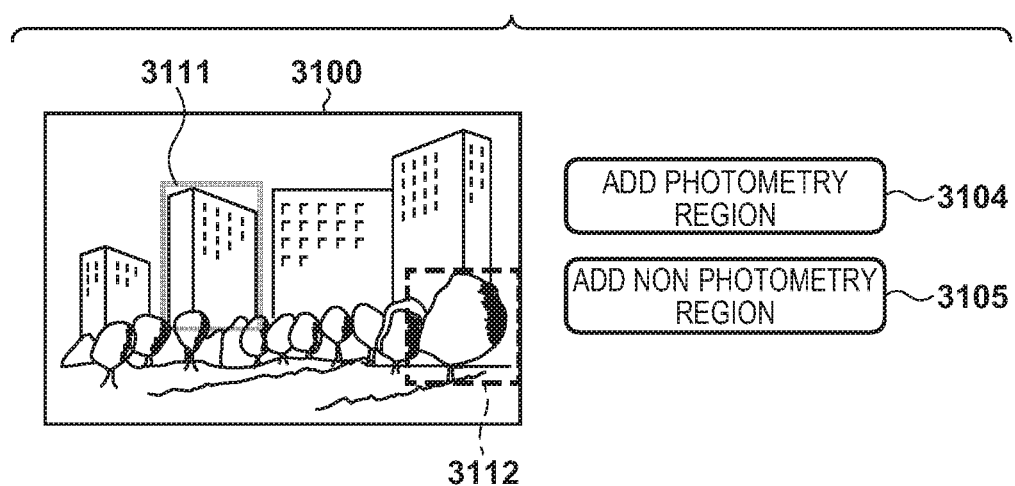

FIG. 3B shows an example in which a processing region and a processing exclusion region have been set inappropriately by the user. In a case in which a photometry region 3111 and a non-photometry region 3112 have been set so as not to overlap each other, the setting of the non-photometry region 3112 will be useless. That is, the region designated as the non-photometry region 3112 is originally not a photometry target region.

Figure 3C:
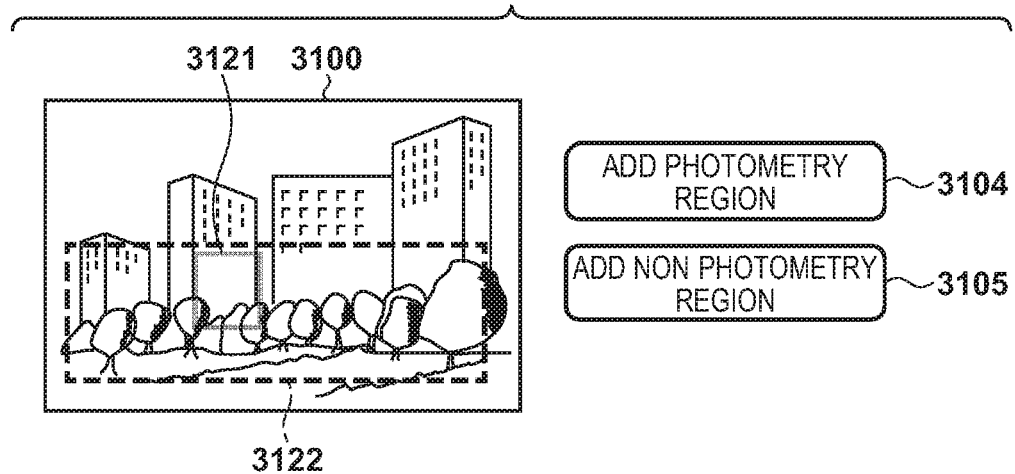

FIG. 3C shows another example in which the processing region and the processing exclusion region have been set inappropriately by the user. In a case in which a photometry region 3121 has been set so as to be completely included in a non-photometry region 3122, the setting of the photometry region 3121 will be useless. That is, as described above, the non-photometry region is set to exclude a part of a region in the photometry region and has a higher priority setting than the photometry region. As a result, the entire region of the photometry region 3121 becomes invalid.

<Operation of Client Apparatus>

In order to prevent the user from making inappropriate settings as shown in FIGS. 3B and 3C described above, it is desirable to provide support to the user by a GUI at the time of the setting of a processing region (for example, a photometry region) and a processing exclusion region (for example, a non-photometry region). Hence, the first embodiment will describe an example in which a range that can be designated in the setting of a second region is restricted based on the setting of a first region.

Figure 4:
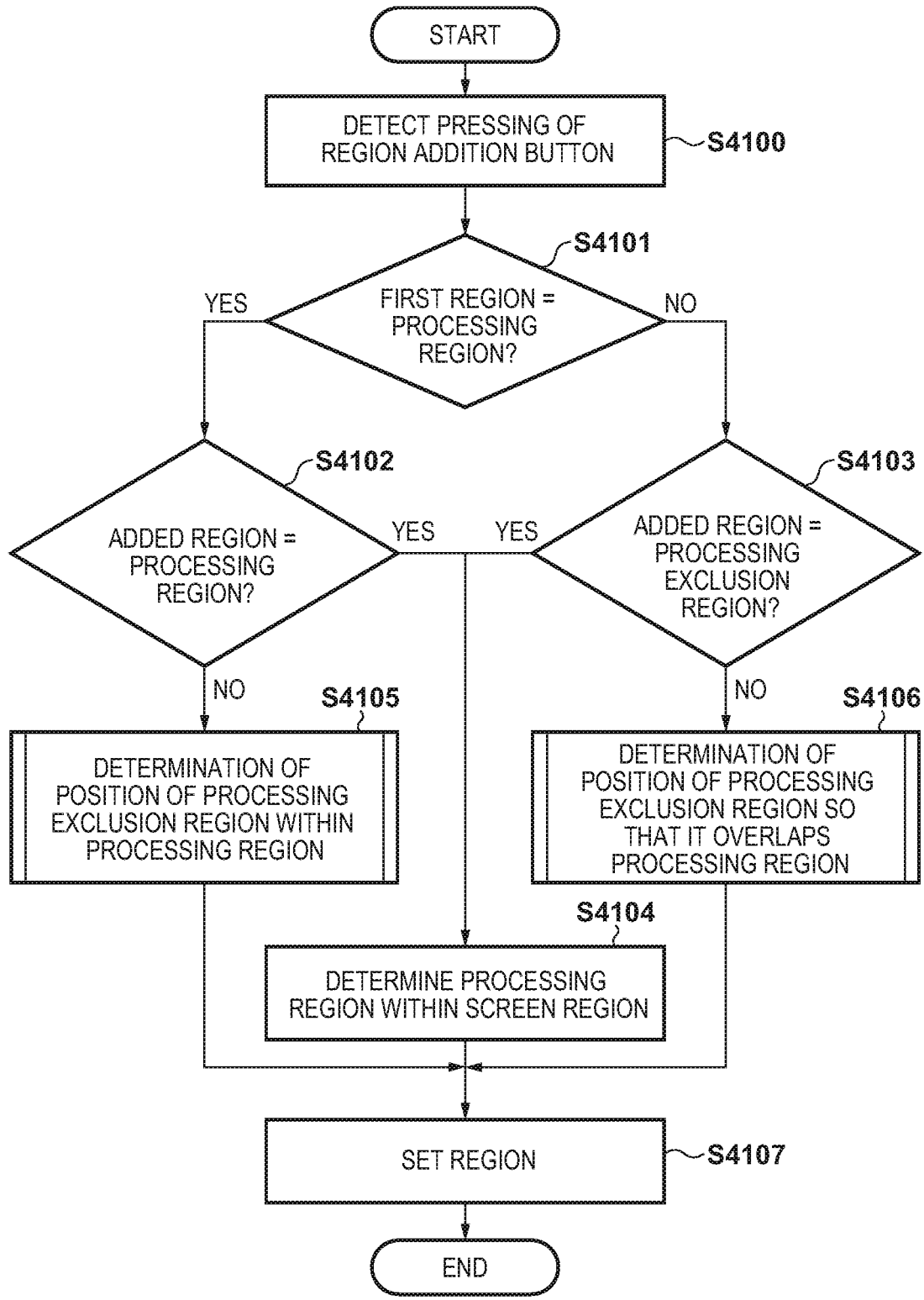
FIG. 4 is a flowchart of region designation according to the first embodiment.

FIG. 4 is a flowchart of region designation according to the first embodiment. More specifically, FIG. 4 shows the operation of the GUI after the user has operated the region setting GUI and set the first region. Note that when the first region is to be set, the region can be set freely within the captured image. That is, when the first region is to be set, the movable region is set to the entire region of the captured image display unit 3100. Note that as the first region, either a processing region or a processing exclusion region may be set.

In step S4100, the system control unit 2001 detects that a region addition button has been pressed. That is, it detects the instruction to add a second region. In step S4101, the system control unit 2001 determines whether the first region which has been already set is a processing region. If the first region is a processing region, the process advances to step S4102. Otherwise (if the first region is a processing exclusion region), the process advances to step S4103.

In step S4102, the system control unit 2001 determines whether the added region (second region) is a processing region. If the added region is a processing region, the process advances to step S4104. Otherwise (if the added region is a processing exclusion region), the process advances to step S4105.

In step S4103, the system control unit 2001 determines whether the added region (second region) is a processing exclusion region. If the added region is a processing exclusion region, the process advances to step S4104. Otherwise (if the added region is a processing region), the process advances to step S4106.

In step S4104, the system control unit 2001 sets the movable region to be the entire region of the captured image display unit 3100. That is, if the first region and the second region belong to the same region type, an arbitrary region can be designated without a problem. Subsequently, the system control unit accepts the designation of a second region by accepting a user operation (instruction to change the shape of a region made by using a mouse) via the input unit 2003.

In step S4105, the system control unit 2001 sets the movable region so that it will be within the first region (processing region). Subsequently, the system control unit accepts user operation via the input unit 2003, and accepts the designation of the second region (processing exclusion region). Step S4105 will be described in detail later with reference to FIG. 5A.

In step S4106, the system control unit 2001 accepts user operation via the input unit 2003. At this time, the second region (processing region) is set so that it partially overlaps the first region (processing exclusion region), and the designation of the second region is accepted. Step S4106 will be described in detail later with reference to FIG. 5B.

In step S4107, the system control unit 2001 sets (confirms) the determined second region that had been designated in step S4104, step S4105, or step S4106.

Figure 5A:
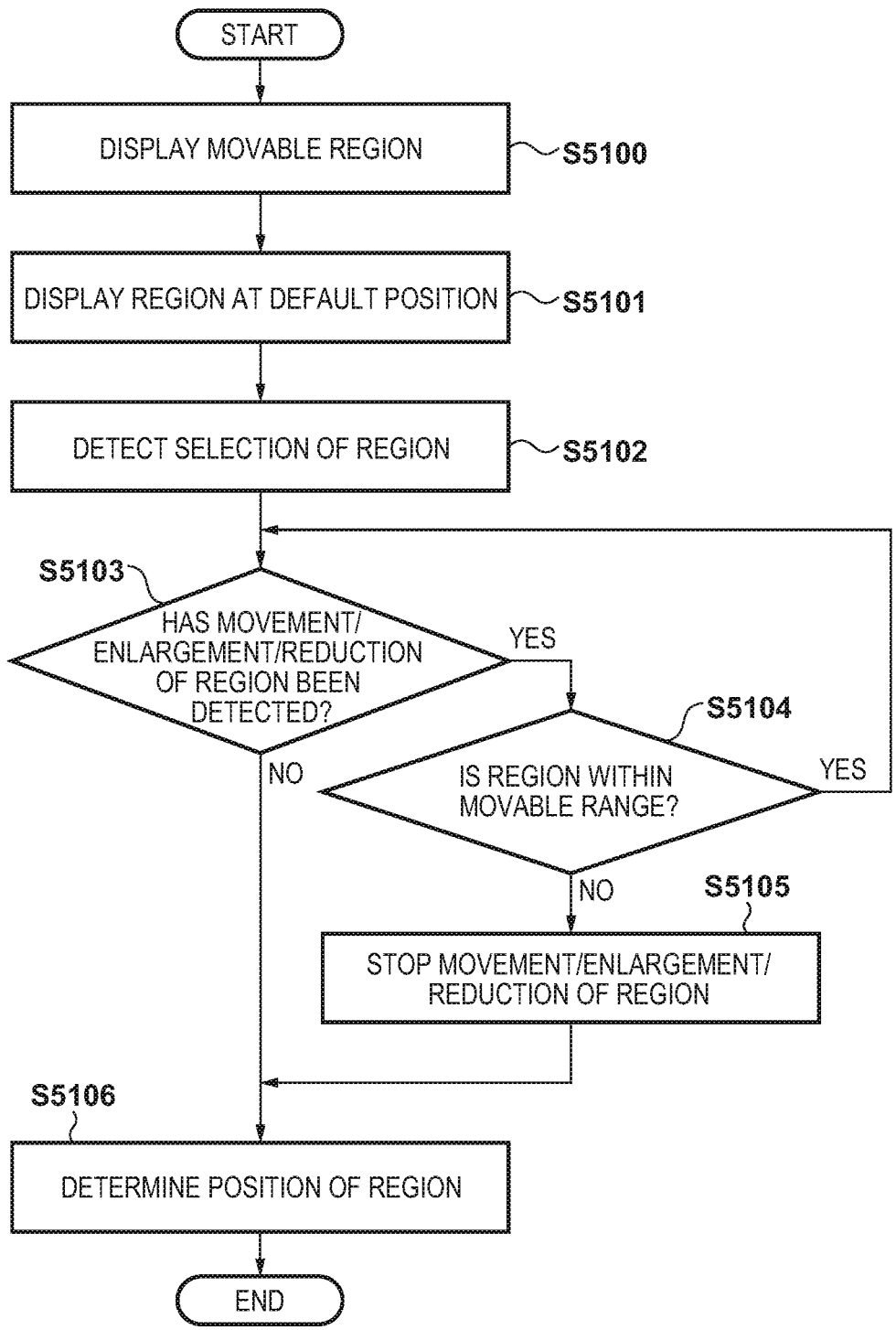
FIGS. 5A and 5B are detailed flowcharts of region position determination.
Figure 5B:
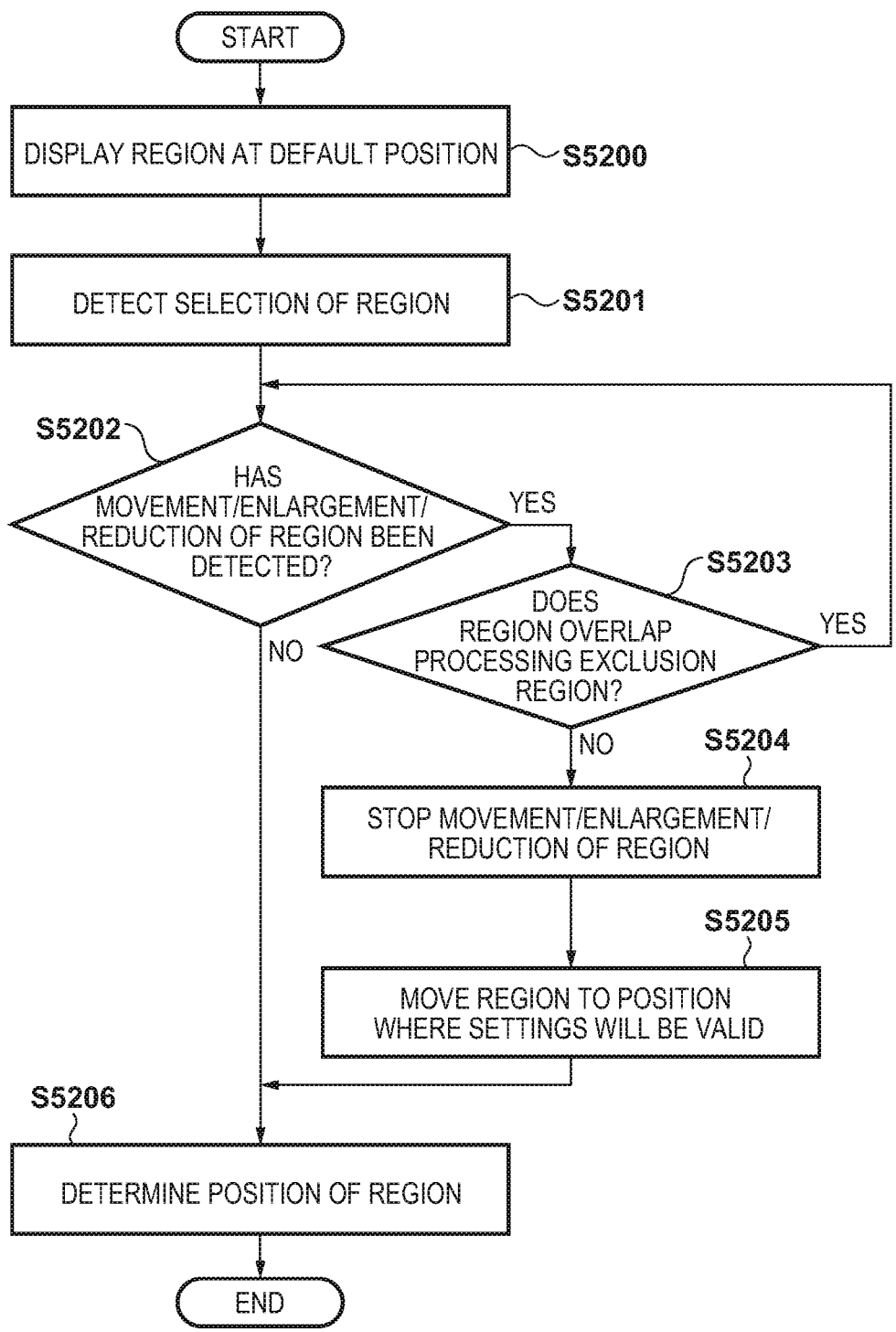

FIGS. 5A and 5B are detailed flowcharts of region position determination of the processing region/processing exclusion region. Each of FIGS. 5A and 5B shows the operation performed after one region of the processing region and the processing exclusion region has been set and the other region is to be set. In particular, FIG. 5A illustrates the detailed flowchart of step S4105, that is, the operation when a processing region has been designated as the first region and a processing exclusion region is to be designated as the second region.

In step S5100, the system control unit 2001 displays the movable region of the processing exclusion region. As described above, it is set here so that the movable region will be equal to the processing region set as the first region. In step S5101, the system control unit 2001 displays, in the default position, a rectangular region indicating the processing exclusion region. Note that the default position (and size) suffices to be in the processing region and to be smaller than the processing region. In step S5102, when the system control unit 2001 detects that the displayed rectangular region has been selected by the user, the process advances to step S5103.

In step S5103, the system control unit 2001 detects whether a user operation to move, to enlarge, or to reduce the rectangular region is currently being performed. If the user operation is detected, the process advances to step S5104. Otherwise, the process advances to step S5106. In step S5104, the system control unit 2001 determines whether the rectangular region is in the movable region. If the rectangular region is in the movable region, the process returns to step S5103 to continue the operation. Otherwise (if the rectangular region has reached the edge of the movable region), the process advances to step S5105. In step S5105, the system control unit 2001 stops accepting the user operation to move, to enlarge, or to reduce the rectangular region, and the process advances to step S5106. In step S5106, the system control unit 2001 determines the currently designated rectangular region as the processing exclusion region.

On the other hand, FIG. 5B illustrates the detailed flowchart of step S4106, that is, the operation when a processing exclusion region has been designated as the first region and a processing region is to be designated as the second region.

In step S5200, the system control unit 2001 displays, in the default position, a rectangular region indicating the processing region. Note that the default position (and size) suffices to be set so that the rectangular region partially includes the processing exclusion region. For example, it suffices for a predetermined area ratio of the rectangular region to overlap the processing exclusion region. In step S5201, when the system control unit 2001 detects that the displayed rectangular region has been selected by the user, the process advances to step S5202.

In step S5202, the system control unit 2001 detects whether a user operation to move, to enlarge, or to reduce the rectangular region is currently being performed. If the user operation is detected, the process advances to step S5203. Otherwise, the process advances to step S5206. In step S5203, the system control unit 2001 determines whether the rectangular region partially overlaps the already set processing exclusion region. If the rectangular region partially overlaps, the process returns to step S5202 to continue the operation. If the rectangular region does not partially overlap or if the entire rectangular region is overlapping, the process advances to step S5204.

In step S5204, the system control unit 2001 stops accepting the user operation to move, to enlarge, or to reduce the rectangular region, and the process advances to step S5205. In step S5205, the system control unit 2001 moves the rectangular region to an appropriate position. For example, it may return the rectangular region to the state immediately before the rectangular region became invalid in the loop of steps S5202 and S5203, or it may return the rectangular region to the default position. Alternatively, the system control unit may make a warning indication instead of moving the rectangular region. These operations can prevent an inappropriate rectangular region from being determined as the processing region as a result. In step S5206, the system control unit 2001 determines the currently designated rectangular region as the processing region.

Figure 6A:
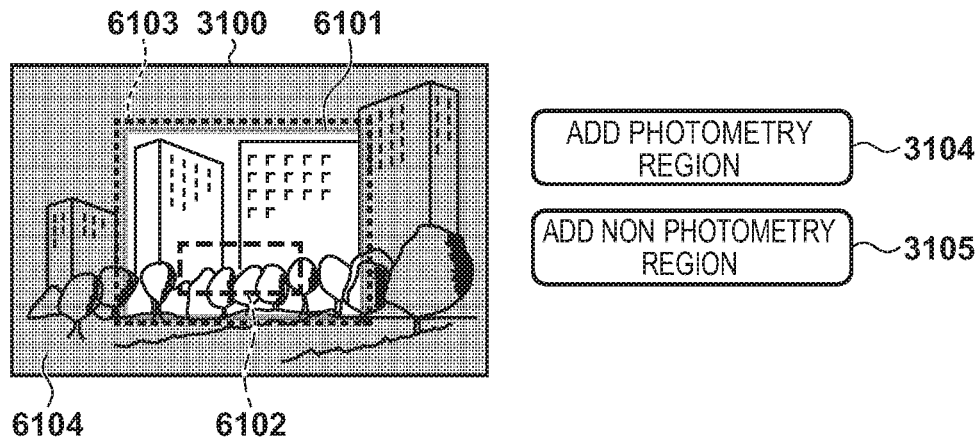
FIGS. 6A and 6B are views each exemplifying a GUI according to the first embodiment.
Figure 6B:
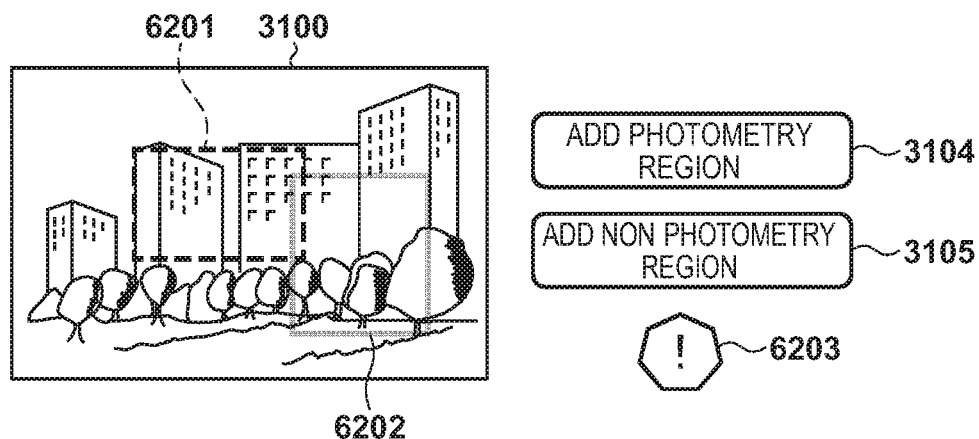

FIGS. 6A and 6B are views each exemplifying the GUI according to the first embodiment. In particular, FIG. 6A illustrates an example of the GUI when a processing exclusion region (non-photometry region) is to be set after a processing region (photometry region) has been set. That is, FIG. 6A exemplifies a GUI corresponding to the processing of FIG. 5A.

First, in the initial state, a photometry region 6101, which has been determined as the first region, is displayed as a gray solid-line rectangle in the captured image display unit 3100. When the addition of a non-photometry region, which is to be the second region, is designated, the border line (periphery) of a movable region 6103 is displayed as a black dotted-line rectangle in the same region as the photometry region 6101. A rectangular region 6102 of the non-photometry region is displayed in the default position within the movable region 6103.

Note that instead of indicating the boundary line of the movable region 6103 by a black broken-line rectangle, a movement disabled indication 6104 may be made to explicitly indicate to the user that the rectangular region 6102 cannot be expanded/moved outside the movable region 6103. The movable region 6103 and the movement disabled indication 6104 may also be displayed together. As the movement disabled indication 6104, it is possible to use, for example, an indication mode in which the captured image is overlapped by a transparent image to decrease the brightness of the captured image. Note that as the movement disabled indication 6104, it is also possible to use, for example, a method of overlapping the captured image by an image which is to reduce the visibility of the outer region of the movable region 6103 by diagonal lines or the like or a method of inverting the color of the captured image may be used. Note that although it has been described here that the movable region 6103 and/or the movement disabled indication 6104 will explicitly displayed, it may be set so that the region and the indication will not be explicitly displayed and will be used only to restrict the expansion/movement of the movable region 6103 by the user. In this case, the warning indication may be made by using characters or an icon.

Furthermore, if the rectangular region 6102 is expanded/moved outside the movable region 6103, a method of making a warning indication by using a text or an icon or a method of changing the color of the frame or color within the frame of the rectangular region 6102 into a warning color such as red may also be used. Also, a region which will become invalid when it is transmitted to the monitoring camera 1000 can be deleted, and an error text indicating this operation may be displayed.

On the other hand, FIG. 6B illustrates an example of the GUI when a processing region (photometry region) is to be set after a processing exclusion region (non-photometry region) has been set. That is, FIG. 6B exemplifies a GUI corresponding to the processing of FIG. 5B.

First, in the initial state, a non-photometry region 6201 determined as the first region is displayed as a black broken-line rectangle in the captured image display unit 3100. When the addition of a photometry region, which is to be the second region, is designated, a photometry region is displayed as a gray solid-line rectangular region 6202 so as to partially include the non-photometry region 6201.

In a case in which the user makes an operation which sets a state in which the non-photometry region 6201 and the rectangular region 6202 do not overlap, a warning indication 6203 is displayed. Note that instead of displaying the warning indication 6203, it may be arranged so that, for example, the color of the frame or the color within the frame of the rectangular region 6202 is changed to a warning color. At this time, if the setting does not change to a valid processing exclusion region setting even after a predetermined time (for example, few seconds) has elapsed since the last user operation, it may be arranged so that at least one of the display of the warning indication and the color change will be executed.

As described above, according to the first embodiment, when a processing region and a processing exclusion region are to be set in the captured image, it is arranged so that a user operation on a region to be newly set will be restricted based on the already set region. These control operations will allow the user to appropriately set the processing region and the processing exclusion region more easily.

Second Embodiment

The second embodiment will describe the operation of the GUI in a case in which a region is to be newly designated when two or more regions have been already set. That is, although the first embodiment described the operation of a GUI when designating a second region, the second embodiment will describe a case in which a third and subsequent regions are to be designated. Note that the arrangement (FIG. 1) of the monitoring system is the same as that of the first embodiment, and thus a description will be omitted.

<Operation of Client Apparatus>

Figure 7:
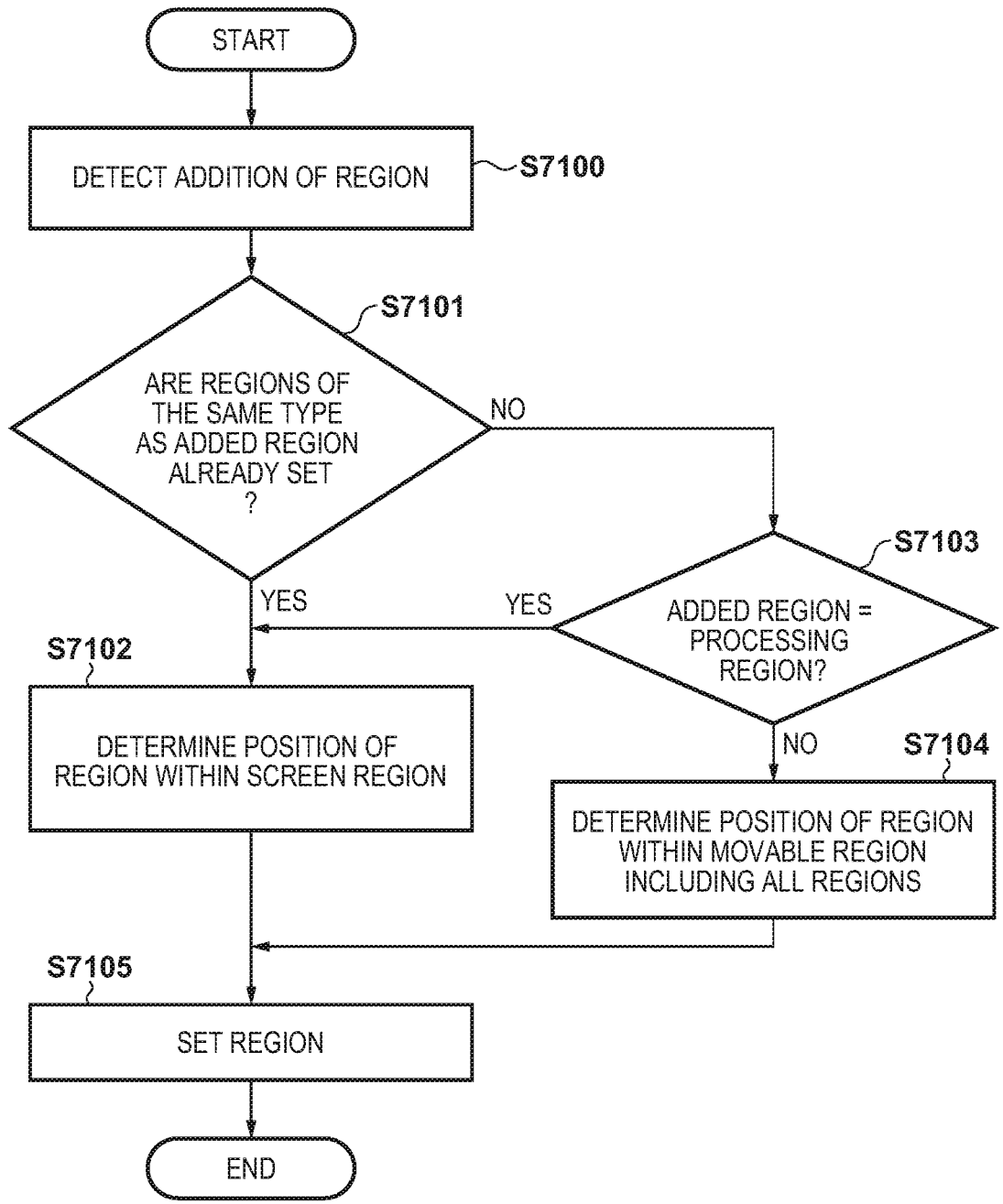
FIG. 7 is a flowchart of region designation according to the second embodiment.

FIG. 7 is a flowchart of region designation according to the second embodiment. More specifically, FIG. 7 shows the operation of a GUI after a user has operated a region setting GUI and has set two or more regions. Note that, as the two or more regions which have been already set, it is possible to set regions formed from only processing regions, regions formed from only processing exclusion regions, or a combination of a processing region and a processing exclusion region.

In step S7100, a system control unit 2001 detects that a region addition button has been pressed. That is, the system control unit detects that the addition of a third or subsequent region has been instructed. In step S7101, the system control unit 2001 determines whether the types of the two or more regions which have been already set are the same as the type of the region whose addition has been indicated in step S7100.

For example, if the addition of a processing region has been instructed in step S7100 and all of the two or more regions which have been already set are processing regions, the process advances to step S7102. On the other hand, if the addition of a processing region has been instructed in step S7100 and all of the two or more regions which have been already set are processing exclusion regions, the process advances to step S7103. Also, if the addition of a processing region has been instructed in step S7100 and the two or more regions which have been already set are a combination of a processing region and a processing exclusion region, the process advances to step S7103.

In step S7103, the system control unit 2001 determines whether the region added in step S7100 is a processing region. If the added region is a processing region, the process advances to step S7102. Otherwise (the added region is a processing exclusion region), the process advances to step S7104.

In step S7102, the system control unit 2001 sets the entire region of a captured image display unit 3100 as the movable region. That is, if the type of the two or more regions which have been already set and the type of the region which was added this time are the same or if the region which was added this time is a processing region, there is no problem in designating the arbitrary region. Subsequently, the system control unit accepts the designation of the region which was added this time by accepting a user operation (region shape change instruction made by using a mouse or the like) via an input unit 2003.

In step S7104, the system control unit 2001 sets a region including the two or more regions which have been already set as the movable region. Subsequently, the system control unit accepts the designation of the region (processing exclusion region), which was added this time, by accepting the user operation made via the input unit 2003. Details of step S7104 will be described later with reference to FIGS. 8A and 8B.

In step S7105, the system control unit 2001 sets (confirms) the determined region that was designated in step S7102 or step S7104.

Figure 8A:
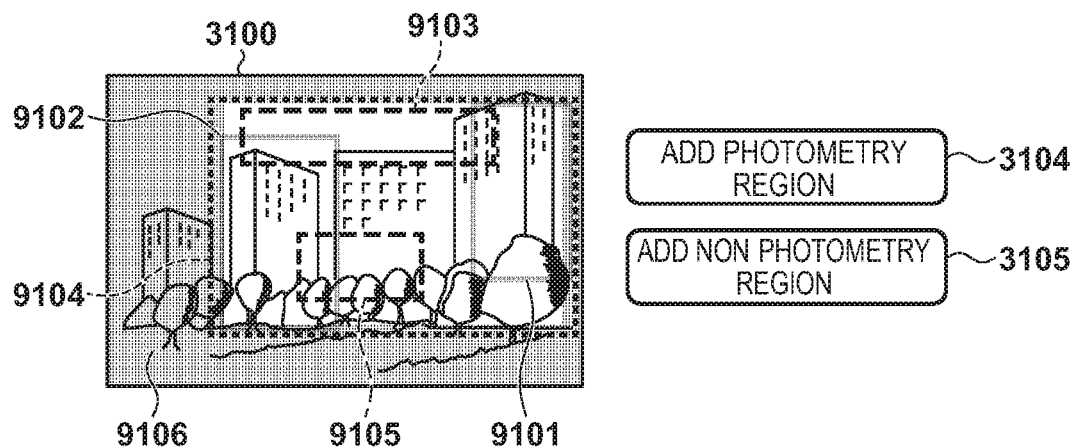
FIGS. 8A and 8B are views each exemplifying a GUI according to the second embodiment.
Figure 8B:
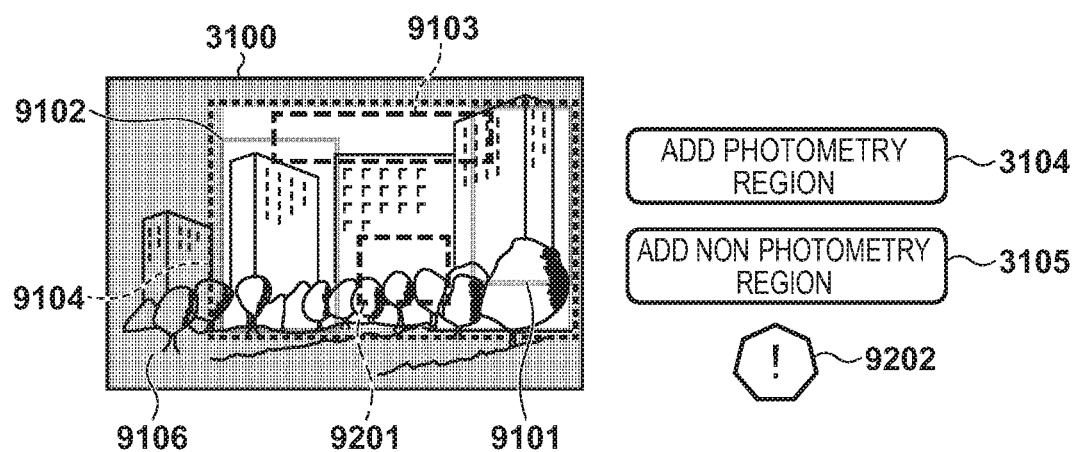

FIGS. 8A and 8B are views each exemplifying the GUI according to the second embodiment. In particular, FIG. 8A illustrates an example of the GUI when a processing exclusion region (non-photometry region) is to be set after two processing regions and one processing exclusion region, that is, a total of three regions have been set.

First, in the initial state, three rectangular regions indicating a photometry region 9101, a photometry region 9102, and a non-photometry region 9103 that have been already set are displayed in the captured image display unit 3100. When the addition of a non-photometry region which will be the fourth region is designated, a movable region 9104 is displayed as a black dotted-line rectangle.

Here, the movable region 9104 is a region which includes all of the photometry region 9101, the photometry region 9102, and the non-photometry region 9103. A rectangular region 9105 indicating the non-photometry region which was added this time is displayed at a default position in the movable region 9104. Note that to explicitly indicate to the user that the rectangular region 9105 cannot be expanded/moved outside the movable region 9104, a movement disabled indication 9106 may also be displayed.

FIG. 8B illustrates an example of the GUI when the user has deformed the rectangular region 9105 in the manner of a rectangular region 9201 in the state shown in FIG. 8A. Since it is possible to consider that a region, which is inside the movable region 9104 and does not belong to any of the three regions which have been already set, may be set across the photometry region 9101 and the photometry region 9102, the region cannot be explicitly indicated as a movement disabled region. However, since the rectangular region 9201 does not overlap any of the processing regions, it is invalid as a processing exclusion region and is inappropriate.

Hence, the presence of an invalid region is explicitly indicated to the user by displaying a warning indication 9202. Note that instead of displaying the warning indication 9202, it may be arranged so that, for example, the color of the frame of the rectangular region 9201 is changed to a warning color. At this time, if the setting does not change to a valid processing exclusion region setting even after a predetermined time (for example, few seconds) has elapsed since the last user operation, it may be arranged so that at least one of the display of the warning indication and the color change will be executed. Alternatively, it may be arranged so that the rectangular region 9201 will be returned to the default position.

As described above, according to the second embodiment, it is arranged so that a user operation on a region to be newly set will be restricted based on the plurality of regions which have been already set. These control operations will allow the user to appropriately set a region more easily even when three or more regions are to be set.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-203703, filed Oct. 20, 2017 which is hereby incorporated by reference herein in its entirety.

What is claimed is:

1. A setting apparatus comprising:
a first setting unit configured to set a first region which is to be a target of photometry processing in an image captured by a capturing device;
a second setting unit configured to set a second region which is to be excluded from the target of photometry processing in the image;
a display controlling unit configured to display the first region and the second region on the image on a display screen;
an accepting unit configured to accept a deformation operation with respect to the first region and the second region on the image displayed on the display screen; and
a controlling unit configured to set a settable region for setting one of the first region and the second region,
wherein the accepting unit restricts a region in which the deformation operation is accepted based on the settable region,
wherein in a case in which the second region is to be set after the first region has been set, the controlling unit sets the settable region of the second region to be within the first region, and
wherein in a case in which the first region is to be set after the second region has been set, the controlling unit sets the settable region of the first region so that the first region overlaps at least a part of the second region.

2. The apparatus according to claim 1, wherein the display controlling unit further displays a restriction indication based on the settable region with respect to the region accepting the deformation operation by the accepting unit.

3. The apparatus according to claim 2, wherein the restriction indication includes at least one of an indication of a boundary line of the settable region, indication to reduce the visibility of an outer region of the settable region, and a warning indication using a character or an icon.

4. The apparatus according to claim 1, wherein in a case in which the first region is to be added after both the first region and the second region have been set, the restricting unit does not restrict the settable range of the first region to be added.

5. The apparatus according to claim 1, wherein in a case in which the second region is to be added after both the first region and the second region have been set, the restricting unit restricts the settable range of the second region to be added to a range that includes all of the first region and the second region which have been already set.

6. The apparatus according to claim 1, wherein a priority of the setting of the second region is higher than a priority of the setting of the first region.

7. A method of controlling a setting apparatus, the method comprising:
setting, in an image captured by a capturing device, one region of a first region which is to be a target of photometry processing and a second region which is to be excluded from the target of the photometry processing;
setting the other region of the first region and the second region;
controlling to display the first region and the second region on the image on a display screen; and
accepting a deformation operation with respect to the first region and the second region on the image displayed on the display screen,
wherein in the setting of the other region, a settable region of the other region is set based on the one region,
wherein the settable region defines a region for setting the one of the first region and the second region, wherein in the accepting of the deformation operation, a region in which the deformation operation is accepted is restricted based on the settable region, wherein in a case in which the second region is to be set after the first region has been set, the settable region of the second region is set to be within the first region, and wherein in a case in which the first region is to be set after the second region has been set, the settable region of the first region is set so that the first region overlaps at least a part of the second region.

8. A non-transitory computer-readable recording medium storing a program that causes a computer to function as a setting apparatus comprising:

a first setting unit configured to set a first region which is to be a target of photometry processing in an image captured by a capturing device;

a second setting unit configured to set a second region which is to be excluded from the target of photometry processing in the image;

a display controlling unit configured to display the first region and the second region on the image on a display screen;

an accepting unit configured to accept a deformation operation with respect to the first region and the second region on the image displayed on the display screen; and a controlling unit configured to set a settable range for setting one of the first region and the second region, wherein the accepting unit restricts a region in which the deformation operation is accepted based on the settable region, wherein in a case in which the second region is to be set after the first region has been set, the controlling unit sets the settable region of the second region to be within the first region, and wherein in a case in which the first region is to be set after the second region has been set, the controlling unit sets the settable region of the first region so that the first region overlaps at least a part of the second region.

9. A setting apparatus comprising:

a first setting unit configured to set a first region which is to be a target of photometry processing in an image captured by a capturing device;

a second setting unit configured to set a second region which is to be excluded from the target of photometry processing in the image;

a display controlling unit configured to display the first region and the second region on the image on a display screen;

an accepting unit configured to accept a deformation operation with respect to the first region and the second region on the image displayed on the display screen; and a determining unit configured to determine whether the second region is to be set after the first region has been set or the first region is to be set after the second region has been set, wherein the accepting unit restricts a region in which the deformation operation is accepted based on the determination result determined by the determining unit, wherein in a case in which the determining unit determines that the second region is to be set after the first region has been set, the second region in the image is set to be within the first region, and wherein in a case in which the determining unit determines that the first region is to be set after the second region has been set, the first region in the image is set so that the first region overlaps at least a part of the second region.

10. A method of controlling a setting apparatus, the method comprising:

setting, in an image captured by a capturing device, one region of a first region which is to be a target of photometry processing and a second region which is to be excluded from the target of the photometry processing;

setting the other region of the first region and the second region;

determining whether the second region is to be set after the first region has been set or the first region is to be set after the second region has been set;

controlling to display the first region and the second region on the image on a display screen; and accepting a deformation operation with respect to the first region and the second region on the image displayed on the display screen, wherein in the accepting of the deformation operation, a region in which the deformation operation is accepted is restricted based on a result of the determining, wherein in a case in which the second region is to be set after the first region has been set, the second region in the image is set to be within the first region, and wherein in a case in which the first region is to be set after the second region has been set, the first region in the image is set so that the first region overlaps at least a part of the second region.

11. A non-transitory computer-readable recording medium storing a program that causes a computer to function as a setting apparatus comprising:

a first setting unit configured to set a first region which is to be a target of photometry processing in an image captured by a capturing device;

a second setting unit configured to set a second region which is to be excluded from the target of photometry processing in the image;

a display controlling unit configured to display the first region and the second region on the image on a display screen;

an accepting unit configured to accept a deformation operation with respect to the first region and the second region on the image displayed on the display screen; and a determining unit configured to determine whether the second region is to be set after the first region has been set or the first region is to be set after the second region has been set, wherein the accepting unit restricts a region in which the deformation operation is accepted based on the determination result determined by the determining unit, wherein in a case in which the determining unit determines that the second region is to be set after the first region has been set, the second region in the image is set to be within the first region, and wherein in a case in which the determining unit determines that the first region is to be set after the second region has been set, the first region in the image is set so that the first region overlaps at least a part of the second region.

* * * * *